P. H. SWEET.
GIN OR LINTER SAW.
APPLICATION FILED JUNE 10, 1918.
1,308,967.
Patented July 8, 1919.
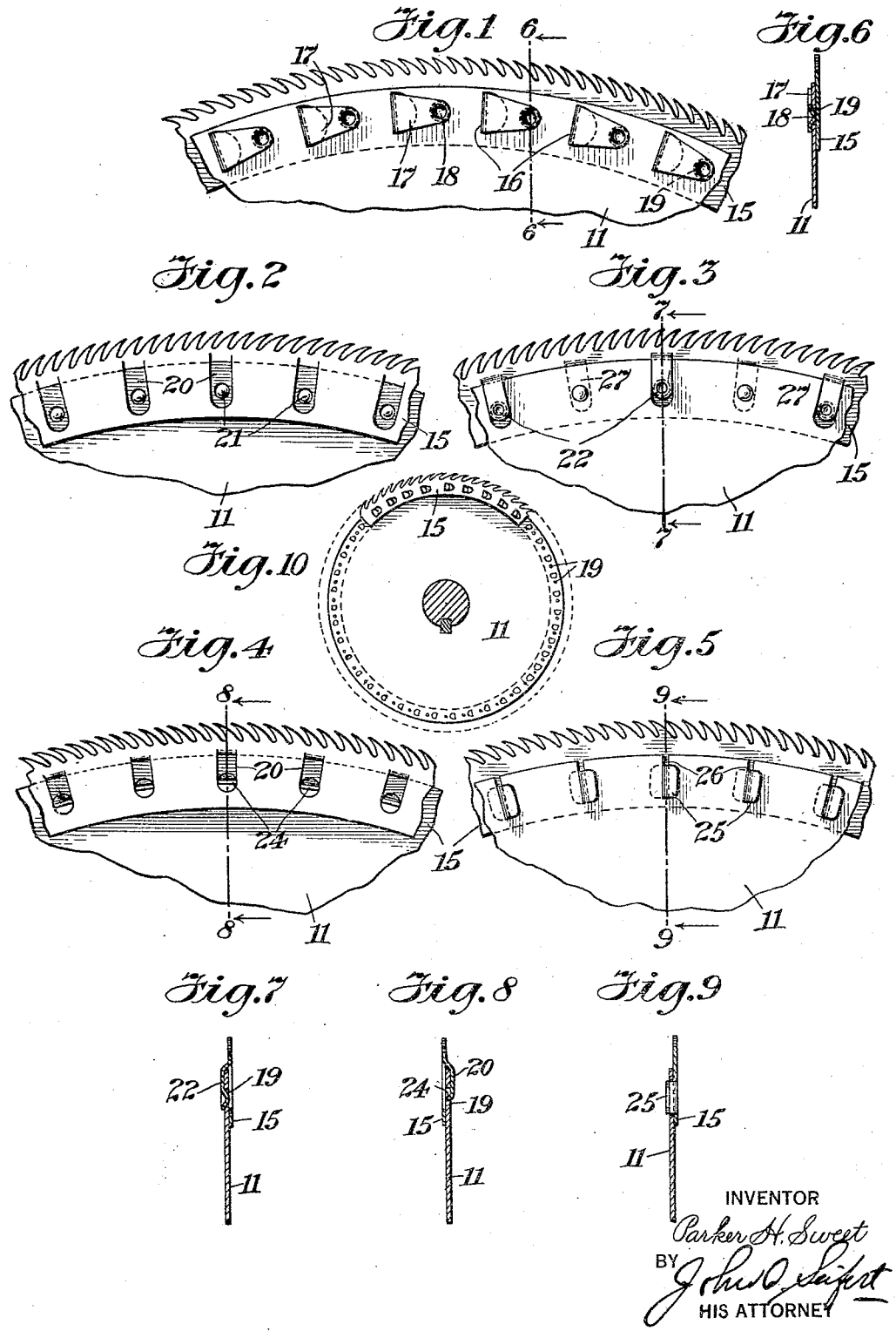
INVENTOR
Parker H. Sweet
BY
HIS ATTORNEY

UNITED STATES PATENT OFFICE.

PARKER H. SWEET, OF BOONTON, NEW JERSEY.

GIN OR LINTER SAW.

1,308,967.   Specification of Letters Patent.   Patented July 8, 1919.

Application filed June 10, 1918. Serial No. 239,124.

*To all whom it may concern:*

Be it known that I, PARKER H. SWEET, a citizen of the United States, and a resident of Boonton, in the county of Morris and State of New Jersey, have invented new and useful Improvements in Gin or Linter Saws, of which the following is a specification.

This invention relates to gin or linter saws. Gin or linter saws consist of disks having teeth at the peripheral edge and a plurality of disks mounted upon a revoluble shaft in juxtaposed and spaced relation. Should the saw teeth be formed directly upon the disks in order to sharpen the teeth, or to renew saws the teeth of which have been broken, it is necessary to remove the saw carrying shaft from its bearings, remove the saws from the shaft and again assemble them on the shaft.

It is the object of the present invention to overcome the necessity of removing the saw carrying shaft and then the saws from the shaft when it is desired to sharpen the teeth of a saw or saws or to substitute one saw for another the teeth of which have been broken.

In carrying out the invention I provide circular members or disks and mount the same upon a shaft, which may be done in a manner similar as has heretofore been the practice in the mounting of such saws, but instead of forming the teeth directly upon the disks toothed annular or circular members or bands are removably connected to the peripheral portion of the disks, and it is a further object of the invention to provide improved means which are novel and simple in construction to releasably secure the toothed members to the circular members or disks.

In the drawings accompanying and forming a part of this specification, Figure 1 is a side elevation of a peripheral portion of a gin or linter saw showing an embodiment of my invention.

Figs. 2, 3, 4 and 5 are views similar to Fig. 1 showing modified forms of the invention.

Fig. 6 is a cross sectional view taken on the line 6—6 of Fig. 1 looking in the direction of the arrow.

Fig. 7 is a cross sectional view taken on the line 7—7 of Fig. 3 looking in the direction of the arrows.

Fig. 8 is a cross sectional view taken on the line 8—8 of Fig. 4 looking in the direction of the arrows.

Fig. 9 is a cross sectional view taken on the line 9—9 of Fig. 5 looking in the direction of the arrows; and Fig. 10 is a side elevation of a gin or linter saw showing in a general way the application of my invention.

Similar characters of reference designate like parts throughout the different views of the drawing.

In the embodiment of my invention shown in the drawing I provide a circular member or disk 11 having a central opening 12 for the engagement of a shaft 13 upon which the disk is mounted to rotate therewith as by a key 14. In the general application of the invention it is to be understood that there are a series of these disks mounted upon the shaft in juxtaposed and spaced relation. Removably secured to the peripheral portion of the disk are circular members or bands 15 having teeth formed on the outer edge, these bands preferably being in sections or segments, as shown in Fig. 10 and forming an annular toothed blade when secured to the disk.

To releasably secure the toothed sections to the disks, as shown in Figs. 1 and 6, and which may be the preferred form, circumferentially disposed and equidistantly spaced openings 16 are provided in the peripheral portion of the disk 11. Clips or tongues 17 are stamped from the body of the toothed bands, said clips extending longitudinally or in a direction of the curvature of the band and are bent to extend laterally from the body of the band and form a shoulder at the juncture of the clips with the body of the band. A nib 18 adjacent the free ends of the clips is pressed from the metal of the clips to form a protuberance to extend in a direction toward the body of the band, as clearly shown in Fig. 6, and the clips are so arranged that the nibs will engage in openings 19 in the disk. The toothed bands are made of resilient material, and the clips 17 are so arranged that the free ends will tend to spring toward the body of the band and are spaced therefrom so that said space will be slightly less than the thickness of the disk, and as the bands are applied to the disk the clips will give sufficient to permit of the inserting of the disk between the nibs and body of the band, and as the clip nibs come in register with the disk openings 19 they will spring into such openings and firmly though releasably retain the band on the disk.

In the construction shown in Fig. 2 the band 15 is provided with clips or tongues 20 to extend transversely of the body of the band and extend laterally from one side of the band, the clips having nibs 21 to engage in the openings 19 in the disk 11 to releasably secure the toothed band thereto. By this construction the openings 16 shown in Figs. 1 and 6 are not required, the toothed band being applied to and removed from the disk by a radial movement.

The embodiment shown in Figs. 3 and 7 is similar to that shown in Fig. 2. However, instead of all of the clips extending laterally from one side of the band only alternate clips or tongues 22 extend laterally from the band, the tongues 23 alternating with the tongues 22, being stamped from the band and extending therefrom slightly in a direction toward the tongues 22, whereby the clips 22 embrace one side of the disks while the body of the band and the clips 23 embrace the opposite side. The tongues 22 and 23 also have nibs or protuberances to engage the openings 19 in the disk 11 to releasably secure the toothed band to the disk.

The embodiment shown in Figs. 4 and 8 is similar to that shown in Fig. 2, but instead of the tongues or clips 20 being provided with the protuberances to engage in the disk openings 19, the ends of the clips are bent up to form a flange 24 to engage in the disk openings to releasably retain the toothed band on the disk.

In the construction illustrated in Figs. 5 and 9 the toothed band 15 has tongues 25 stamped therefrom to extend laterally and substantially at right angles to the band to engage in openings or slots 26 in the disk by a movement either radially or laterally of the disk, and the tongues are then bent to extend in a direction longitudinally of the band.

Having thus described my invention, I claim:

1. In gin or linter saws, the combination of a toothed annulus consisting of segmental sections and a disk to carry the same, one of which is provided with integral yielding clips and the other arranged with slots for the engagement of the clips to releasably connect the segmental sections and the disk.

2. In gin or linter saws, the combination of a disk member and an annular toothed member consisting of a plurality of segmental sections, one of which members is provided with resilient clips stamped therefrom and the other member arranged with slots for the engagement of the clips to releasably connect the members with the teeth of the segmental sections projecting beyond the periphery of the disk member.

3. In gin or linter saws, the combination of a disk, an annular toothed section, clips stamped from the toothed section and between which clips and the body of the toothed section the peripheral portion of the disk is adapted to engage, and the clips and disk being arranged to releasably lock the toothed section to the disk.

4. In gin or linter saws, the combination of a disk arranged to be mounted upon a shaft; annular toothed segments; clips stamped from and bent laterally of the toothed segments, and between which clips and the body of the segments the peripheral portion of the disk is adapted to engage; and said clips provided with nibs to coöperate with the disk to releasably secure the toothed segments to the disk.

5. In gin or linter saws, a curbed band having teeth formed on the outer edge, and clips stamped from the band to extend laterally thereof, said clips having nibs extending in a direction toward the body of the band for the purpose specified.

6. In gin or linter saws, a band of circular form having teeth on the outer end, clips stamped from the band to extend laterally from and in a direction longitudinally of the band, and nibs formed on the clips to extend in a direction toward the body of the band for the purpose specified.

7. In gin or linter saws, the combination of a disk having radial slots extending inward from the periphery; a band of circular form having teeth on the outer edge; clips stamped from the band to extend laterally therefrom and in a direction longitudinally of the band, said clips being arranged to engage in the disk slots to engage at one side of the disk with the body of the band at the opposite side of the disk; and nibs formed on the clips to engage openings in the disk for the purpose specified.

PARKER H. SWEET.

Copies of this patent may be obtained for five cents each, by addressing the "Commissioner of Patents, Washington, D. C."